UNITED STATES PATENT OFFICE.

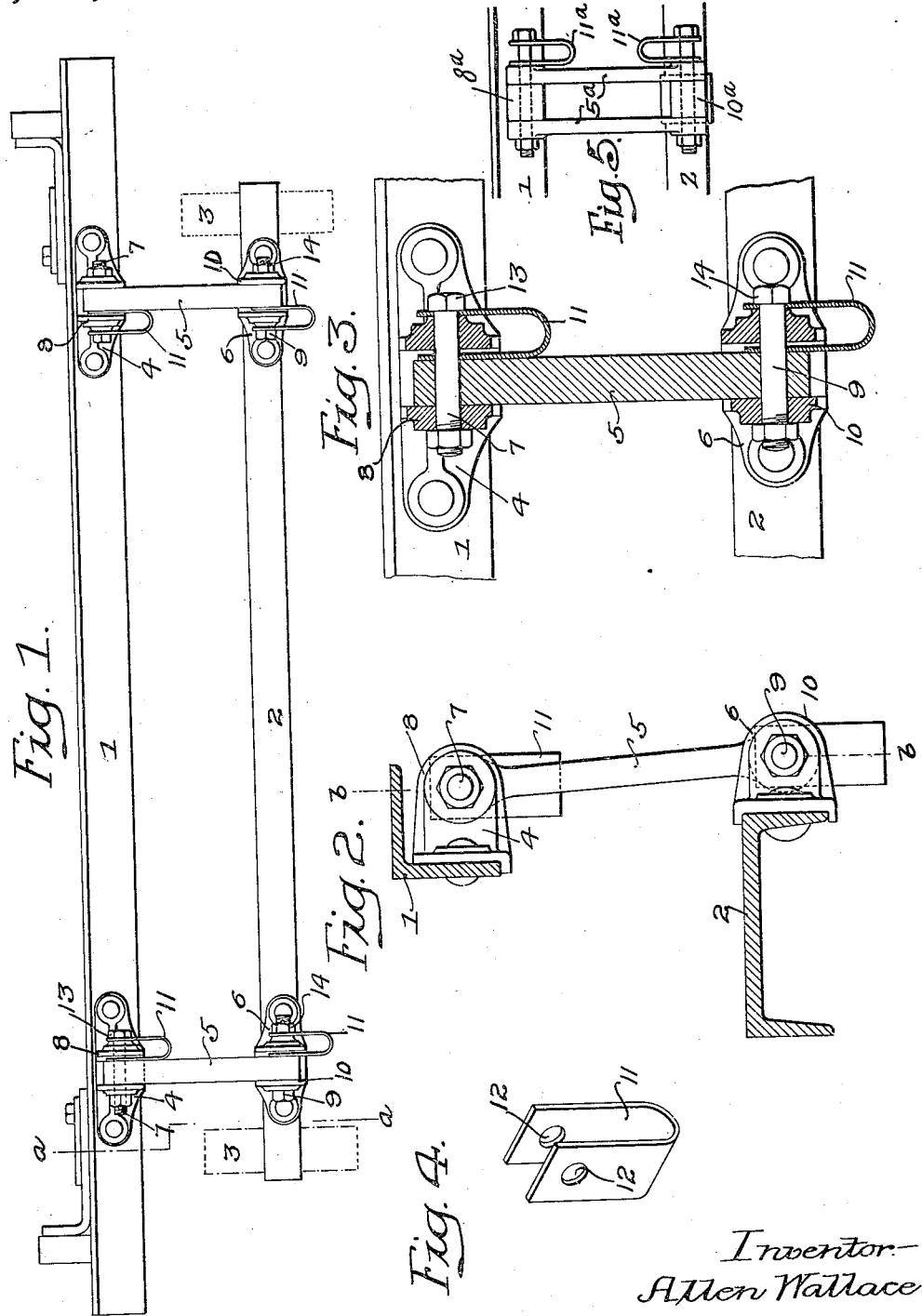

ALLEN WALLACE, OF MOORESTOWN, NEW JERSEY, ASSIGNOR TO THE BALDWIN LOCOMOTIVE WORKS, OF PHILADELPHIA, PENNSYLVANIA, A CORPORATION OF PENNSYLVANIA.

NON-CHATTERING BRAKE-HANGER.

1,138,430.          Specification of Letters Patent.          Patented May 4, 1915.

Application filed February 6, 1914. Serial No. 816,993.

*To all whom it may concern:*

Be it known that I, ALLEN WALLACE, a citizen of the United States, residing in Moorestown, Burlington county, New Jersey, have invented certain Improvements in Non-Chattering Brake-Hangers, of which the following is a specification.

The object of my invention is to provide a simple and effective means for preventing the chattering of the parts of a brake hanger. This object I attain in the following manner, reference being had to the accompanying drawings, in which:—

Figure 1, is a longitudinal sectional view of sufficient of a car brake to illustrate my invention; Fig. 2, is an enlarged transverse sectional view on the line $a$—$a$, Fig. 1; Fig. 3, is a sectional view on the line $b$—$b$, Fig. 2; Fig. 4, is a perspective view of the spring which forms the anti-rattler; and Fig. 5, is a view of a modification.

Referring to the drawings, 1 is the transom of the car truck.

2 is the brake beam extending from one side of the truck to the other and having the brake heads 3, which carry the brake shoes.

4, 4 are the brackets secured to the transom near each end, in the present instance.

5, 5 are the links which form the hangers.

6, 6 are the brackets secured to the brake beam.

7 is a bolt which extends through the bearings 8 on the brackets 4 and through an opening in the upper end of the hanger 5.

9 is a bolt extending through the bearings 10 on a bracket 6 and through an opening in the lower end of the hangers 5.

In order that the brake shoes will accommodate themselves to the wheels of the truck and to allow a free movement of the brake beam, the connections between the two bearings and the link or hangers are loose, consequently, there is a chattering of the parts as the truck travels over the rails. In order to reduce this chattering, I provide a simple and effective means consisting of a U-shaped spring 11 having an opening 12 near each end, as illustrated in Fig. 4. The bolt is passed through the openings. In the present instance, one arm of the spring rests against the head 13 of the bolt 7 and the other arm rests against the side of the link or hanger 5, consequently, when the parts are assembled, the spring forces the hanger 5 away from one bearing 8 and in close contact with the other bearing, so that, while the hanger can move under pressure, chattering is eliminated. The same device is applied to the lower bearing. The spring 11 bears against the head 14 of the bolt 9 and bears against one side of the hanger or link 5, causing the hanger to rest in close contact with one of the bearings 10 and to be free of the other bearing.

In Fig. 5, I have shown my invention applied to a double hanger. The two links $5^a$ are located one on each side of the bearing $8^a$ and bearing $10^a$, and this latter bearing is formed on the brake head $3^a$, in the present instance. The springs $11^a$ are mounted between one of the links and the heads of the bolts.

The invention relates solely to the anti-chattering device and not to any particular construction of the brake mechanism.

While I have shown one arm of the U-shaped spring bearing against the head of the bolt, it will be understood that the bolt may be arranged so that the spring will bear against the nut thereon; the nut being the equivalent of the head.

I claim:—

1. The combination in brake mechanism for car trucks, of a transom; a bracket thereon having bearings spaced a distance apart; a hanger less in width than the distance between the bearings; brake mechanism suspended from the hanger; a bolt extending through the bearings and the hanger; and a U-shaped spring having openings near the ends, the bolt passing through the openings, one end of the spring bearing against the bolt and the other end bearing against the hanger, causing the hanger to be forced against one of the bearings.

2. The combination in brake mechanism for car trucks, of upper and lower bearings, the upper bearing being secured to the transom of the truck and the lower bearing being secured to the truck beam; a hanger connecting the bearings; a bolt passing through each bearing and the hanger; and two U-shaped springs, each spring having an opening in each end, one spring being mounted on one bolt and the other spring being mounted on the other bolt and each spring bearing against the head of its bolt and the hanger.

In testimony whereof, I have signed my name to this specification, in the presence of two subscribing witnesses.

ALLEN WALLACE.

Witnesses:
WM. A. BARR,
JOS. H. KLEIN.

Copies of this patent may be obtained for five cents each, by addressing the "Commissioner of Patents, Washington, D. C."